United States Patent
Wilkins (10) Patent No.: US 10,493,905 B2
(45) Date of Patent: Dec. 3, 2019

(54) ACCESSORY MOUNT ASSEMBLY FOR MOTOR VEHICLE

(71) Applicant: WILCO AUTOMOTIVE PRODUCTS, INC., Santa Ana, CA (US)

(72) Inventor: Paul Wilkins, Santa Ana, CA (US)

( * ) Notice: Subject to any disclaimer, the term of this patent is extended or adjusted under 35 U.S.C. 154(b) by 83 days.

(21) Appl. No.: 15/599,228

(22) Filed: May 18, 2017

(65) Prior Publication Data
US 2017/0334347 A1   Nov. 23, 2017

Related U.S. Application Data

(60) Provisional application No. 62/339,740, filed on May 20, 2016.

(51) Int. Cl.
| B60Q 1/30 | (2006.01) |
| F21S 43/237 | (2018.01) |
| F21V 21/14 | (2006.01) |

(52) U.S. Cl.
CPC .............. B60Q 1/30 (2013.01); F21S 43/237 (2018.01); *F21V 21/145* (2013.01)

(58) Field of Classification Search
CPC . B60D 1/52; B60D 1/565; B60D 1/58; B60D 1/075; B60Q 1/30; F21S 43/237; B60R 9/06
See application file for complete search history.

(56) References Cited

U.S. PATENT DOCUMENTS

| | | | |
|---|---|---|---|
| 5,094,373 A | 3/1992 | Lovci | |
| 5,845,983 A | 12/1998 | Schmidt | |
| 6,089,431 A | 7/2000 | Heyworth | |
| 6,457,733 B1 * | 10/2002 | Hansen | B60D 1/075 280/481 |
| 6,457,734 B1 * | 10/2002 | Hansen | B60D 1/075 280/481 |
| 6,672,609 B2 | 1/2004 | Pierman et al. | |
| 6,685,212 B1 * | 2/2004 | Penlerick | B60D 1/143 280/477 |
| 6,835,021 B1 | 12/2004 | McMillan | |
| 6,902,183 B2 * | 6/2005 | Rodgers | B60D 1/00 280/504 |
| 7,100,956 B1 | 9/2006 | Wilkins | |
| 7,222,873 B2 * | 5/2007 | Rodgers | B60D 1/00 248/226.11 |
| 8,714,792 B2 | 5/2014 | Adams | |
| 9,016,643 B2 * | 4/2015 | Sterling | B60D 1/488 248/200 |
| 9,108,581 B2 | 8/2015 | Perez | |
| 9,849,825 B2 * | 12/2017 | Salami, Jr. | B60Q 1/0035 |
| 10,081,223 B2 * | 9/2018 | Allen | B60D 1/58 |
| 2004/0156205 A1 * | 8/2004 | Pisciotti | B60Q 1/305 362/485 |
| 2005/0199671 A1 * | 9/2005 | Riley | B60R 9/06 224/512 |
| 2009/0001109 A1 | 1/2009 | Wilkins | |

* cited by examiner

Primary Examiner — Corey N Skurdal
(74) Attorney, Agent, or Firm — Gray Law Firm; Gordon E. Gray, III (57) ABSTRACT

A mount assembly for attaching a light bar to a tow mount of a vehicle. The mount assembly has a bracket with a channel that allows the tow mount to only enter the bracket from a first direction. The tow mount is secured within the channel by a blocking member that extends across at least a portion of the channel.

4 Claims, 6 Drawing Sheets

FIG. 6

ACCESSORY MOUNT ASSEMBLY FOR MOTOR VEHICLE

INCORPORATION BY REFERENCE TO ANY PRIORITY APPLICATIONS

Any and all applications for which a foreign or domestic priority claim is identified in the Application Data Sheet as filed with the present application are hereby incorporated by reference and made a part of the present disclosure.

BACKGROUND

Field

The present disclosure relates to generally to an accessory mount assembly for a motor vehicle and, in particular, to a mount assembly that attaches to a mount point of a motor vehicle.

Description of Related Art

Accessories can be mounted on to a vehicle to customize the appearance of the vehicle and/or to add functionality to the vehicle. For example, motor vehicle accessories can include lights, fender flares, side steps, brush and grill guards, tow hitches, winches, hood racks, roof racks, and bike carriers. To simplify installment, reduce installment costs, and avoid damaging the vehicle, many accessories are designed to reversibly attach to an existing feature of the vehicle such as a bumper, a mirror, or a portion of the vehicle frame.

Light bars and spot beams are accessories that can be added to a motor vehicle to enhance driving or to otherwise provide light in low light conditions. Existing light bar and spot beam accessories often use brackets that attach to the front grill of the vehicle or to the gutter rail near the roof of the vehicle.

SUMMARY

A need exists for a simple, reversible way of attaching accessories such as lights to a vehicle, or to at least provide the public with a useful choice. The systems, methods and devices described herein have innovative aspects, no single one of which is indispensable or solely responsible for their desirable attributes. Without limiting the scope of the claims, some of the advantageous features will now be summarized.

An aspect of the present invention is a bracket that is attachable to a tow mount of a vehicle, the bracket having a bracket body that defines a channel, the channel having a first portion spaced apart from a second portion, the channel having at least one open side that allows the tow mount to enter the channel from a first direction, the channel having a slot through which a portion of the tow mount extends when the tow mount is seated in the channel, the first and second portions being configured to block the tow mount from leaving the channel along a second or third direction, the second and third directions being orthogonal to one another and to the first direction. In some aspects, the bracket may include a blocking element that extends across at least a portion of the channel. In certain aspects, the bracket has an intermediate portion that connects the first portion of the channel to the second portion of the channel. In some aspects, the intermediate portion and the blocking element are substantially planar. In certain aspects, the intermediate portion is substantially parallel with the blocking element.

Another aspect of the present invention is a mount assembly that has a first bracket and a second bracket spaced apart from the first bracket, a spacer bar extends between the first and second bracket, a mount arrangement is carried by at least one of the first bracket, the second bracket, and the spacer bar, the mount arrangement is adapted to provide an attachment site for coupling a structure to the mount assembly, the first and second bracket having a bracket body that defines a channel, the channel having a first portion spaced apart from a second portion, the channel having at least one open side that allows the tow mount to enter the channel from a first direction, the channel having a slot through which a portion of the tow mount extends when the tow mount is seated in the channel, the first and second portions being configured to block the tow mount from leaving the channel along a second or third direction, the second and third directions being orthogonal to one another and to the first direction.

Another aspect of the present invention is a lighting assembly for a vehicle, the lighting assembly having a first bracket and a second bracket spaced apart from the first bracket, a spacer bar extends between the first and second bracket, a mount arrangement is carried by at least one of the first bracket, the second bracket, and the spacer bar, the mount arrangement is adapted to provide an attachment site for coupling a lighting assembly to the mount assembly, the first and second bracket having a bracket body that defines a channel, the channel having a first portion spaced apart from a second portion, the channel having at least one open side that allows the tow mount to enter the channel from a first direction, the channel having a slot through which a portion of the tow mount extends when the tow mount is seated in the channel, the first and second portions being configured to block the tow mount from leaving the channel along a second or third direction, the second and third directions being orthogonal to one another and to the first direction.

BRIEF DESCRIPTION OF THE DRAWINGS

Throughout the drawings, reference numbers can be reused to indicate general correspondence between reference elements. The drawings are provided to illustrate example embodiments described herein and are not intended to limit the scope of the disclosure.

DETAILED DESCRIPTION

Embodiments of systems, components and methods of assembly and manufacture will now be described with reference to the accompanying figures, wherein like numerals refer to like or similar elements throughout. Although several embodiments, examples and illustrations are disclosed below, it will be understood by those of ordinary skill in the art that the inventions described herein extend beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Figure 1:
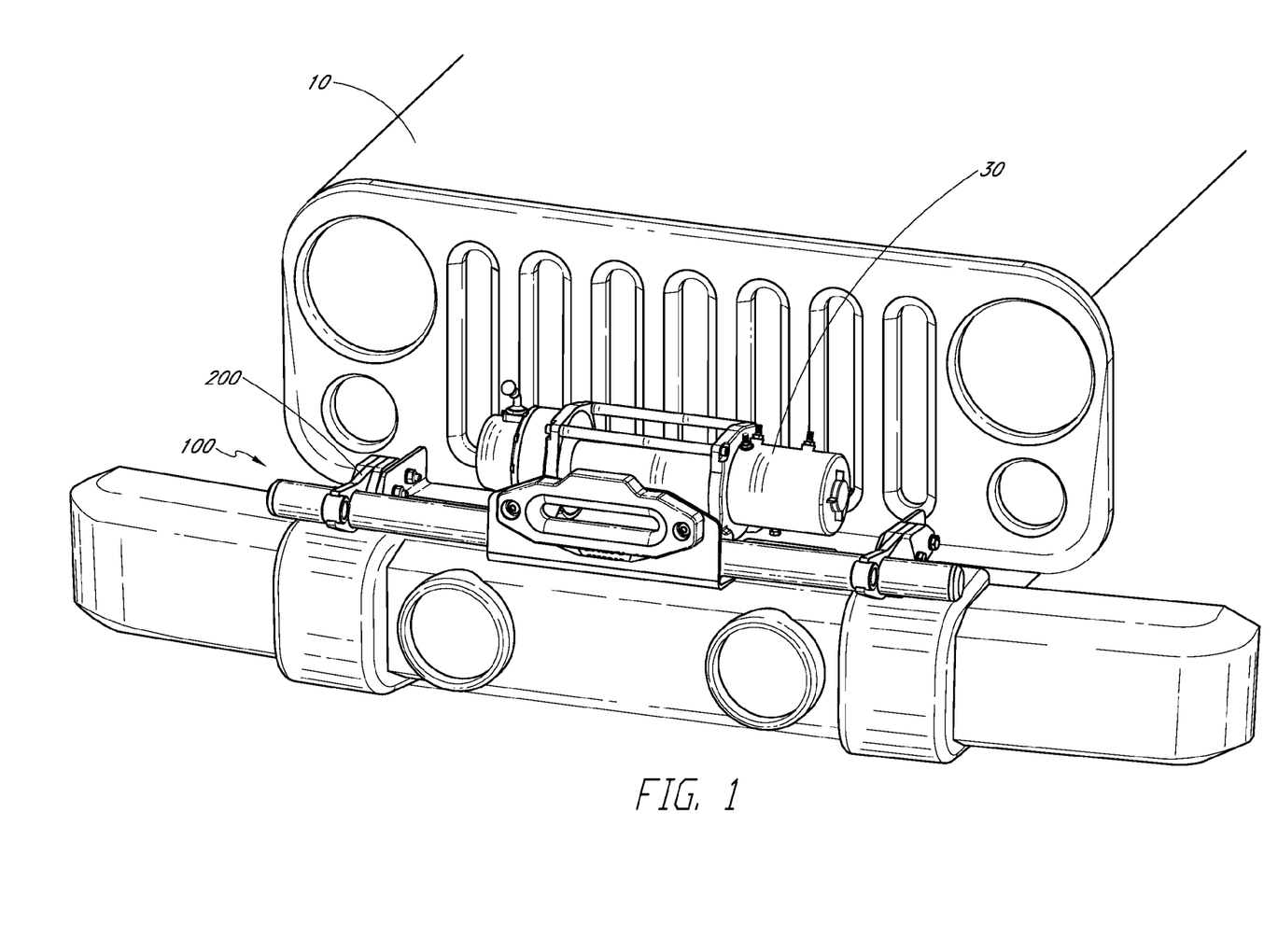
FIG. 1 is a perspective view of an embodiment of the mount assembly mounted onto a vehicle.

FIG. 1 depicts a perspective view of a non-limiting, illustrative embodiment of the mount assembly 100 of the present disclosure mounted on the front end of a vehicle 10. In some configurations, the mount assembly 100 can reversibly attach to the motor vehicle 10. The mount assembly can be adapted attach to the motor vehicle 10 without damaging (e.g., drilling holes in) the motor vehicle 10. In some configurations, the mount assembly 100 can be easily attached to an accessible portion of the vehicle. For example, in the illustrated embodiment, the mount assembly 100 attaches to a tow mount 20 (e.g., a tow hook—FIG. 2) of the motor vehicle 10. For sake of clarity, the mount assembly 100 will hereinafter be described from the perspective of the vehicle 10 on which the mount assembly 100 is mounted, which has a front end, a rear end, a right side and a left side from the perspective of a driver or passenger of the vehicle 10. A longitudinal direction extends between the front and the rear of the vehicle 10 and coincides with or is parallel to a central plane or axis of the vehicle. A lateral direction extends between the right side and the left side of the vehicle 10 and coincides with or is parallel to a lateral plane or axis of the vehicle. The lateral direction is perpendicular to the longitudinal direction.

Figure 2:
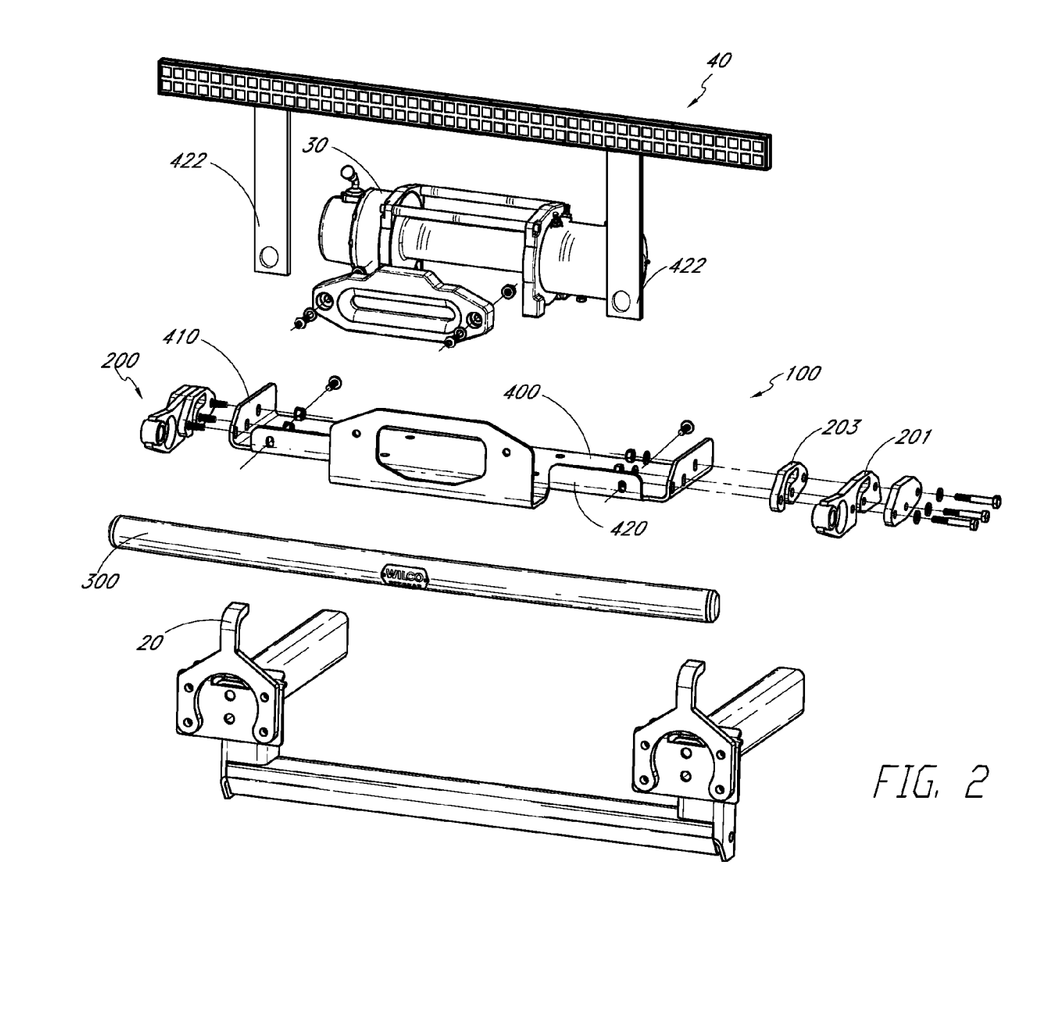
FIG. 2 is an exploded view of the mount assembly of FIG. 1.

FIG. 2 shows an exploded view of the embodiment of the mount assembly 100 of FIG. 1. In some configurations, the mount assembly 100 can include one or more brackets 200, a spacer bar 300, and a mounting platform 400. In the illustrated embodiment, the mounting platform 400 extends between a pair of brackets 200 and has end portions 410 that help enclose the tow mount 20 within the bracket 200. In some configurations, the mounting platform 400 does not attach to the bracket 200 or help enclose the tow mount 20 within the bracket 200, as discussed in more detail below. In some configurations, the mounting platform 400 can provide mounting points for one or more accessories. For example, in the illustrated embodiment, the mounting platform 400 has a rear horizontal surface to which an accessory such as winch 30 can be attached. The accessory can be attached directly to the vehicle 10 through one or more openings provided on the mounting platform 400. In some configurations, the accessory can attach to the vehicle 10 indirectly by attaching directly to the mounting platform 400. The mounting platform 400 can attach directly or indirectly to the vehicle 10.

The mounting platform 400 can provide a mounting point or location on which a light bar 40 can be attached. For example, as shown in FIG. 2, the mounting platform 400 can have a front vertical surface 420 on which a light bar 40 can be attached. In the illustrated embodiment, the light bar 40 is attached to the front vertical surface 420 by a pair of struts 422 that lift the light bar 40 vertically past the winch 30. The struts 422 can have through holes that align with through holes disposed on the front vertical surface 420, allowing a fastener to be passed through the through holes to attach the strut 422 to the front vertical surface 420 of the mounting platform 400. In some embodiments, the struts 422 can form a unitary structure with the vertical surface 420 of the mounting platform 400.

In some configurations, the mount assembly 100 can attach to a motor vehicle 10 that already has an existing accessory or other feature already on the motor vehicle 10. For example, as shown in the depicted embodiment of FIG. 3, the mount assembly 100 can have a mounting platform 400 that is adapted to leave open the space between the brackets 200. In the illustrated embodiment, the mounting platform 400 attaches to the spacer bar 300 and allows the mount assembly 100 to attach to a motor vehicle 10 that has a winch 30 attached to the front end of the motor vehicle 10 without requiring the winch 30 to be removed.

Figure 3:
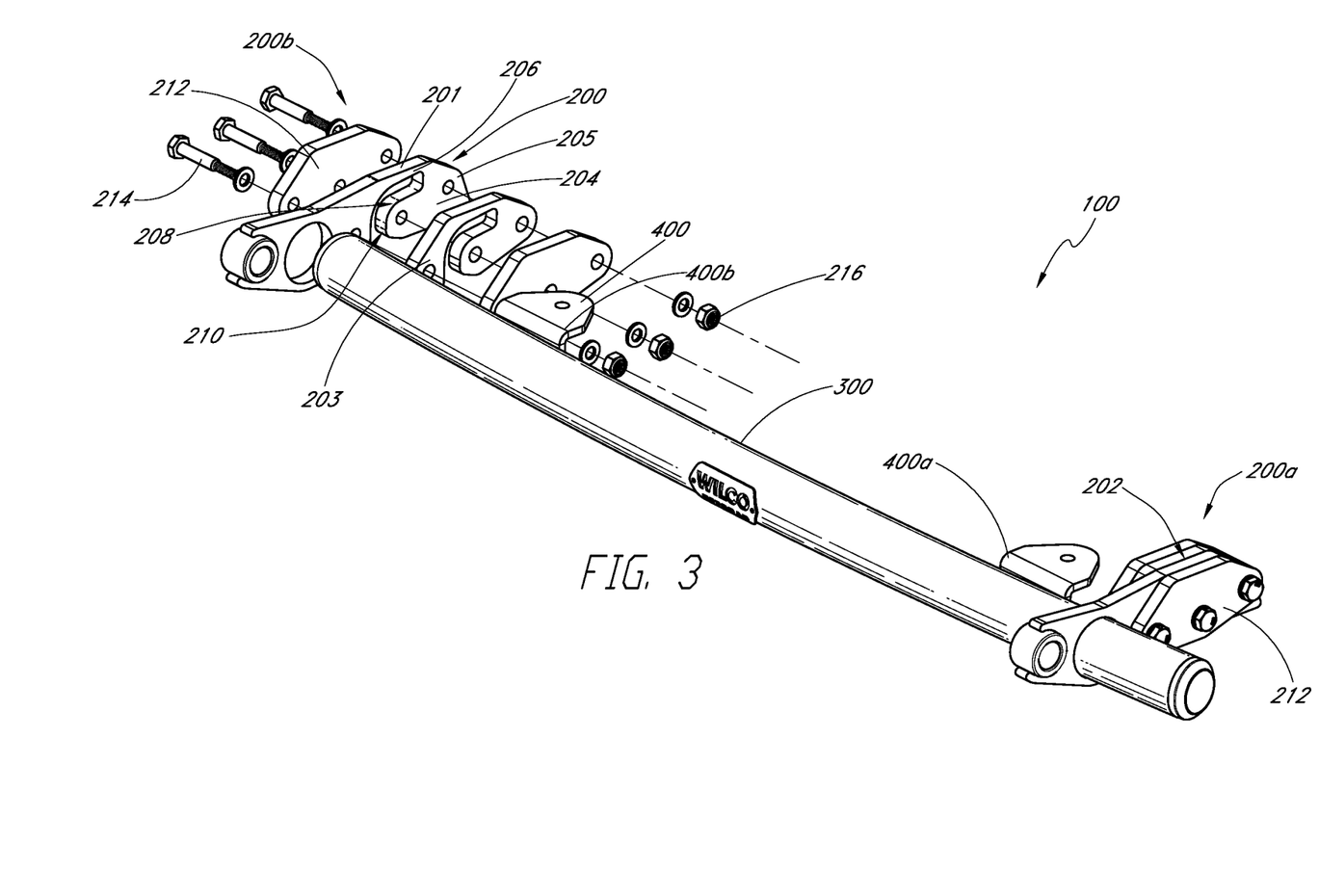
FIG. 3 is a front and top perspective view of an embodiment of the mount assembly.

In the embodiment shown in FIG. 3, the mount assembly 100 has a first bracket 200a and a second bracket 200b that are attached to and spaced apart from one another on the spacer bar 300. The depicted mounting assembly 100 also has a pair of mounting platforms 400a, 400b that are attached to and spaced apart from one another on the spacer bar 300. The mounting platforms 400 can include an attachment site 401 (e.g., a surface surrounding or defining a through hole) that allows an accessory, such as a light bar, to be attached to the mounting platform 400. In some embodiments, the mount assembly 100 of the present disclosure does not include each of the aforementioned components. Additionally, the components of the mount assembly 100 can be arranged differently than the mount assembly 100 shown in FIG. 3. For example, in one embodiment, the mount assembly 100 does not have a spacer bar 300 extending between the brackets 200a, 200b or the mount assembly 100 has only a single bracket 200 that is attached directly to a single mounting platform 400.

FIG. 3 shows an exploded view of an embodiment of the second bracket 200b. In the illustrated arrangement, the second bracket 200b is a mirror image of the first bracket 200a. In other configurations, the brackets 200a, 200b can be identical to one another. In other configurations, the brackets 200a, 200b could be different from one another, such as in the event that the mount points (e.g., tow mounts or hooks) of the vehicle are different from one another. Either bracket 200a, 200b can be referred to herein as a bracket 200. As discussed in more detail below, the bracket 200 can receive and retain the tow mount 20 of the vehicle 10. As discussed above, the first bracket 200a may also be referred to as the left bracket because it is located on the left side of the vehicle 10, and the second bracket 200b may be referred to as the right bracket because is it located on the right side of the vehicle 10. Similarly, the spacer bar 300 is located in front of or forward of the mounting platform 400.

With continued reference to FIG. 3, the bracket 200 can have a bracket body 202 that is configured to receive and retain a tow mount 20. The bracket body 202 can comprise a central portion 201 and one or more a spacer portions 203. In some embodiments, the bracket body 202 has no spacer portion 203 or the bracket body 202 has a configuration that is different from the configuration shown in FIG. 3. For example, the bracket body 202 can comprise a spacer portion 203 that is disposed laterally of the central portion 201, or the bracket body 202 can have no spacer portion 203, or the bracket body 202 can have one or more spacer portions 203 disposed on either side of the central portion 201.

The bracket body 202 can be configured to receive at least a portion of the tow mount 20. In some configurations, the bracket body 202 has a first portion 204 that is spaced apart from a second portion 206 to define a channel 208. The channel 208 can be adapted (e.g., sized and shaped) to receive the tow mount 20 within the channel 208. The channel 208 can be open on at least one side to allow the tow mount 20 to be inserted into the channel 208. The bracket 200 can be adapted so that the tow mount 20 can enter and leave the channel 208 along a first direction but cannot enter or leave the channel 208 along a direction other than the first direction. In the illustrated embodiment, the channel 208 has an inlet opening 210 that allows the tow mount 20 to be inserted into the channel 208 from a lateral direction (relative to the vehicle 10). The first and second portions 204, 206 of the bracket body 202 prevent the tow mount 20 from entering or exiting the channel 208 along any direction that is not substantially aligned with the lateral direction.

The bracket 200 can include one or more blocking elements 212 that at least partially blocks the inlet opening 210 to retain the tow mount 20 within the channel 208 after the tow mount 20 has been inserted into the channel 208. As shown in FIG. 3, the bracket 200 can have a blocking element 212 disposed on the lateral side and the medial side of the bracket body 202. In some configurations, the bracket 200 has a blocking element 212 disposed on only one side of the bracket body 202. As shown in FIG. 2, in some configurations, the end portions 410 of the mounting platform 400 can function as a blocking element 212. Referring again to FIG. 3, the blocking element 212 can be secured to the bracket body 202 by a fastener 214 (e.g., a threaded bolt) that passes through the blocking element 212 and the bracket body 202 and is secured by a nut 216. Alternatively, the bracket body 202 or the blocking element 212 could include a threaded opening portion such that the fastener 214 can be coupled directly to the bracket body 202 or the blocking element 212. The blocking element 210 can be secured to the bracket body 202 by other fastening means known in the art (e.g., clip, screw). In the illustrated embodiment, the blocking element 212 is a cap that completely covers the inlet opening 210 of the channel 208. In some embodiments, the blocking element 212 covers only a portion of the inlet opening 210 of the channel 208.

With continued reference to FIG. 3, the blocking portion 212 of the bracket 200 is lateral to the bracket body 202. In other words, in the illustrated embodiment, both brackets 200 have the bracket body 202 positioned between the midline of the vehicle 10 and the blocking element 212. However, the brackets 200 of the mount assembly 100 can have other configurations. For example, the blocking element 212 of both brackets 200 can be positioned between the midline of the vehicle 10 and the bracket body 202, or the blocking element 212 can be on the left side of both brackets 200, or on the right side of both brackets 200.

Figure 4:
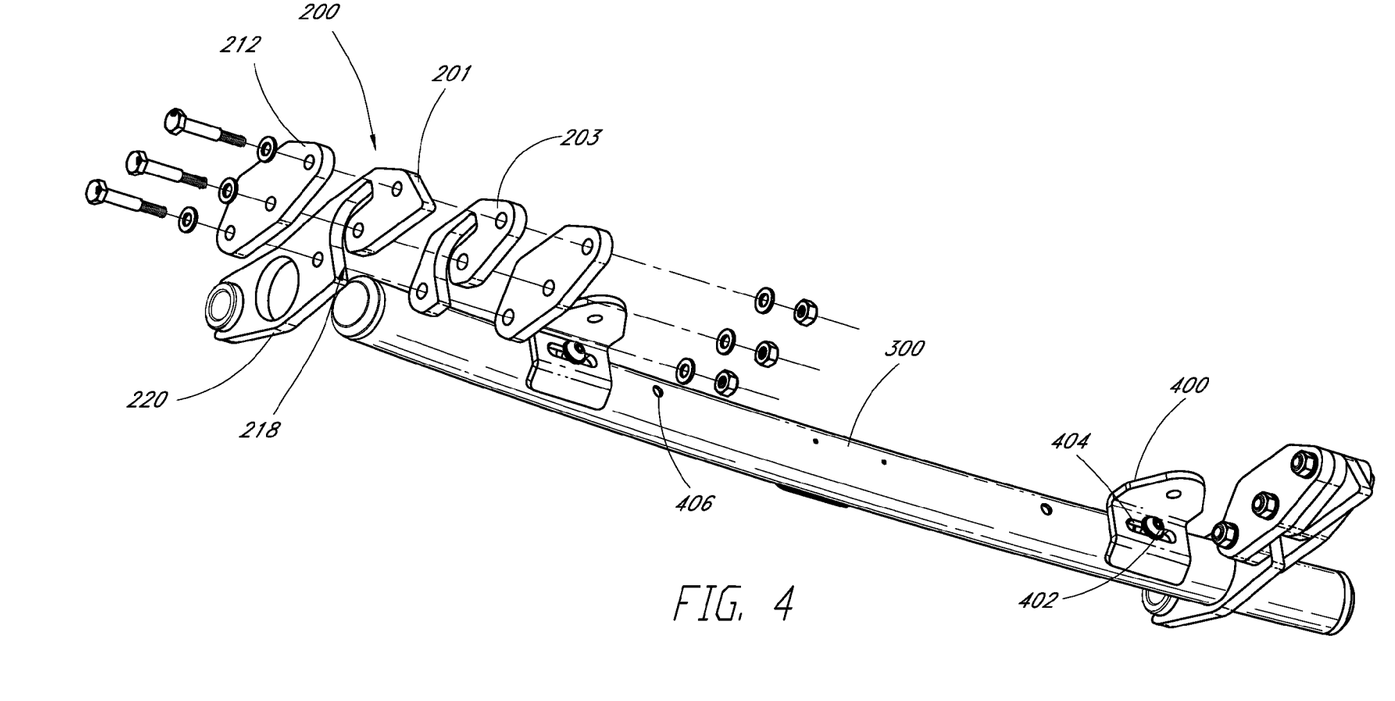
FIG. 4 is a rear and bottom perspective view of the mount assembly of FIG. 3.

FIG. 4 is a bottom rear perspective view of the mount assembly 100 of FIG. 3. The bracket 200 has an outlet opening 218 through which the base of the tow mount 20 passes to join with the vehicle 10. As can be seen in FIG. 4, the bracket 200 can be adapted to substantially surround the tow mount 20 when the blocking element 212 is attached to the bracket body 202. The channel 208 can be sized and shaped to substantially correspond to the size and shape of the tow hook 20 or other mount point. Alternatively, the channel 208 can be sized and shaped to contact the tow hook 20 at several discrete locations, such as one or more of the front, rear, top and bottom surfaces. Preferably, the discrete locations are selected to retain the bracket 200 tightly on the tow hook 20 to reduce or substantially eliminate movement of the bracket 200 on the tow hook 20. In some embodiments the bracket 200 only partially surrounds the tow mount 20, as discussed in more detail below.

The bracket 200 can have an arm 220 that attaches to the spacer bar 300 of the mount assembly 100. In some embodiments, the arm 220 is fixed to or supports the spacer bar 300. In certain variants, the arm 220 can slide along the spacer bar 300, allowing the position of the bracket 200 on the spacer bar 300 to be adjusted. For example, the arm 220 can include a reversible fastener (e.g., a set screw) that allows the arm 220 to be released from the spacer bar 300, moved to a desired position, and then re-tightened to fix the arm 220 on the spacer bar 300 at the desired position. The arm 220 can include a mount point, such as a hook or the illustrated ring, to substitute for the functionality of the tow hook 20.

The position of the mounting platform 400 on the spacer bar 300 can also be adjustable. In some embodiments, the mounting platform 400 is welded or otherwise attached to the spacer bar 300 in such a way that the position of the mounting platform on the spacer bar 300 cannot be adjusted. In the illustrated embodiment, the mounting platform 400 has a fastener 402 (e.g., a screw or bolt) that passes through a slot 404 of the mounting platform 400 and engages a threaded hole 406 on the spacer bar 300. The position of the mounting platform 400 can be adjusted by loosening the screw 402, sliding the mounting platform 400 to the desired position, and re-tightening the screw 402 to fix the mounting platform 400 on the spacer bar 300 at the desired position. The spacer bar 300 can include a plurality of threaded holes 406 that allow the position of the mounting platform 400 on the spacer bar 300 to be adjusted. The position of the mounting platform 400 can be adjusted by removing the screw 402 from one threaded hole 406, positioning the slot 404 of the mounting platform 400 over another threaded hole 406, passing the screw 402 through the slot 404 and into the threaded hole 406, and re-tightening the screw 402 to fix the mounting platform 400 on the spacer bar 300 at the desired threaded hole 406.

Figure 5:
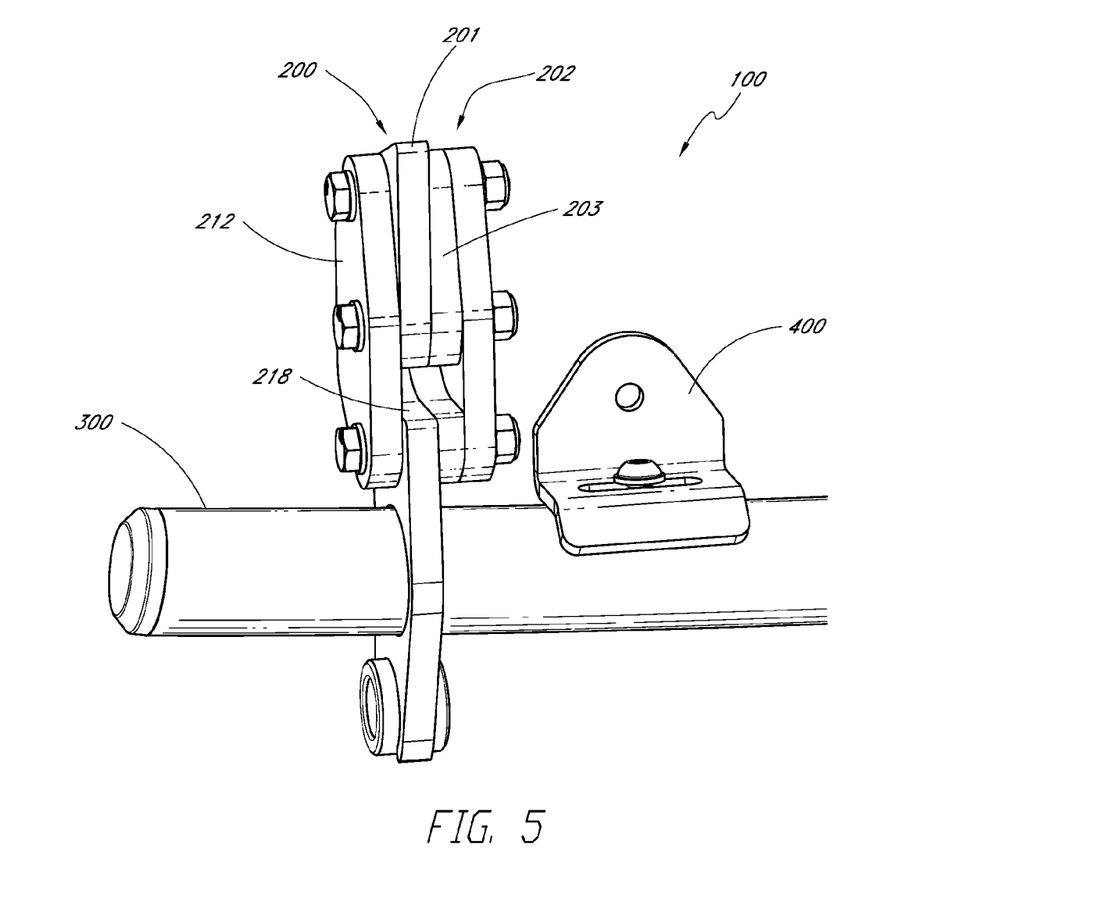
FIG. 5 is a bottom view of a bracket of the mount assembly of FIG. 4.

FIG. 5 is a bottom view of a portion of the mount assembly 100 that is shown in FIG. 3. As discussed, the bracket body 202 can include a central portion 201 and a spacer portion 203. In some embodiments, the central portion 201 and the spacer portion 203 could form a unitary structure. In some embodiments, the central portion 201 is separate from the spacer portion 203. In the illustrated embodiment, the channel 208 is formed by a slot in the central portion 201 that aligns with a slot in the spacer portion 203. In some embodiments, the spacer portion 203 may not have a slot but may have instead a groove that aligns with the slot in the central portion 201 and extends only partially across the spacer portion 203. In the illustrated embodiment, the mount assembly 100 has plate-like blocking elements 212 that do not have grooves and are disposed medially and laterally of the central portion 201. In some configurations, the mount assembly 100 can have one or more blocking elements 212 that have a groove that aligns with the slot in the central portion 201. The groove can be configured to receive at least a portion of the tow mount 20.

Figure 6:
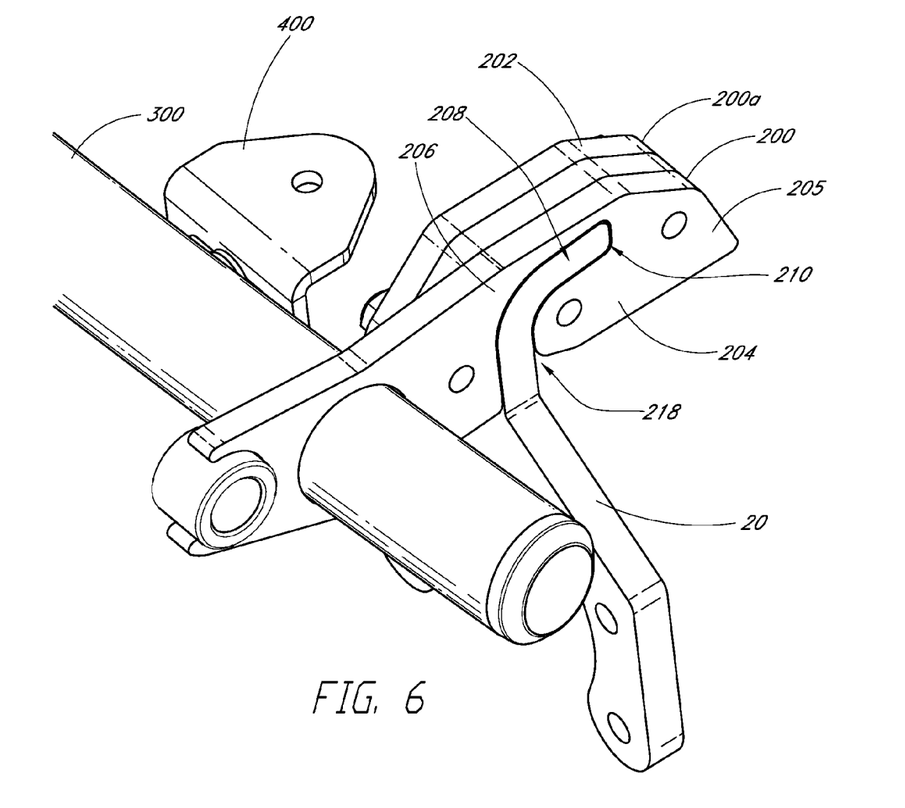
FIG. 6 is a partial side view of the mount assembly of FIG. 4 mounted onto a tow mount.

FIG. 6 is a partial side view of the mount assembly 100 shown in FIGS. 3-5 with a tow mount 20 inserted into the bracket 200 of the mount assembly 100. In FIG. 6, the blocking element 212 on the lateral side of the bracket body 202 has been removed so that the tow mount 20 that is retained within the channel 208 can be seen. In the depicted embodiment, the channel 208 is J-shaped and is adapted to retain a tow mount 20 having a similar shape. The channel 208 can be adapted to retain tow mounts 20 having other shapes. For example, in some embodiments the channel 208 is adapted to retain a D-shaped tow mount 20.

As can be appreciated from FIG. 6, when the tow mount 20 is inside the channel 208, the first and second portions 204, 206 of the bracket body 202 hit the tow mount 20 when the bracket 200 is rotated about an axis that is parallel to the longitudinal axis of the threaded bolt 214. In this way, the first and second portions 204, 206 prevent the tow mount 20 from escaping the bracket 200 through the outlet opening 218. Contact between the tow mount 20 and the first and second portions 204, 206 also prevents translational movement of the mount assembly 100 within the plane that is normal to the longitudinal axis of any one of the threaded bolts 214.

In the illustrated embodiment, the first and second portions 204, 206 are joined by an intermediate portion 205 that is co-planar with the first and second portions 204, 206 and extends around the tip portion of the channel 208. However, in some embodiments, the first and second portions 204, 206 can be joined by an intermediate portion 205 that spans across a portion of the channel 208. For example, the first and second portions 204, 206 can be joined by an intermediate portion 205 that extends from threaded bolt 214 that is closest to the spacer bar 300 to the threaded bolt 214 that is immediately adjacent to this bolt 214. In other words, the mount assembly 100 of the present disclosure is not limited to the plate-like structures that are depicted in the figures but can include bars, collars, slotted rings, or other structures that only partially surround the tow mount 20.

Referring back to FIG. 3, a method for mounting the mount assembly 100 onto a tow mount 20 of a vehicle 10 will now be described. The method is meant to be illustrative only and may be modified to accommodate other embodiments of the mount assembly 100 that are within the scope of the present disclosure. Generally speaking, the bracket body 202 can be positioned over the tow mount 20 by initially aligning the channel 208 alongside of the tow mount 20 and then moving the bracket body 202 laterally across the tow mount 20 to slide the bracket body 202 over the tow mount 20. In some embodiments, the mount assembly 100 has a pair of brackets 200 that each have the inlet opening 210 of the channel 208 on the same side (e.g., left or right) of the bracket 200. For example, if both brackets 200 have the inlet opening 210 on the left side of the bracket 200, then the mount assembly 100 is positioned to the right of the tow mounts 20 and moved to the left to bring the tow mount 20 into the channels 208 of the brackets 200, or vice-versa. Once the tow mount 20 is positioned within the channel 208, the blocking elements 212 can then be attached to the bracket body 202, as described above, to secure the tow mount 20 within the channel 208.

In some embodiments, the mount assembly 100 can be mounted onto the tow mount 20 by sliding the bracket 200 relative to the spacer bar 300. For example, the mount assembly 100 may have a pair of brackets 200 that each have the inlet opening 210 on the lateral surface of the bracket 200. The mount assembly 100 can be mounted onto the tow mount 20 by sliding the brackets 200 medially along the spacer bar 300 until the brackets 200 are medial to the tow mount 20. The mount assembly 100 is then positioned to align the inlet openings 210 with the tow mounts 20, and then the brackets 200 are moved laterally along the spacer bar 300 to bring the tow mounts 20 into the channels 208 of the brackets 200. Once the tow mounts are in the channels 208, the brackets 200 can be tightened to the spacer bar 300 to prevent the brackets 200 from moving relative to the tow mount 20. In this embodiment just discussed, the mount assembly 100 may not require a blocking element 212 to maintain the tow mount 20 within the channel 208.

CONCLUSION

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. A bracket attachable to a tow mount of a vehicle, the bracket comprising:
    a central portion having a first slot;
    a spacer portion attached to the central portion, the spacer portion having a second slot that aligns with the first slot;
    a first blocking element attached to the central portion, at least a portion of the first blocking element covering the first slot of the central portion, the central portion being interposed between the first blocking element and the spacer portion; and
    a second blocking element attached to the spacer portion, at least a portion of the second blocking element covering the second slot of the spacer portion, the spacer portion being interposed between the second blocking element and the central portion.

2. The bracket of claim 1, wherein the first slot is sized to receive at least a portion of the tow mount of the vehicle.

3. The bracket of claim 1, wherein the central portion and the spacer portion form a unitary structure.

4. The bracket of claim 1, wherein the central portion is fastened to the spacer portion by a fastener that passes through the central portion and the spacer portion.

* * * * *